United States Patent
Al-Ghamdi et al.

(10) Patent No.: US 8,202,432 B2
(45) Date of Patent: Jun. 19, 2012

(54) WASTEWATER TREATMENT SYSTEM

(75) Inventors: Abdullah Saeed Al-Ghamdi, Jeddah (SA); Abdulrahaman S. Alghamdi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 360 days.

(21) Appl. No.: 12/457,894

(22) Filed: Jun. 24, 2009

(65) Prior Publication Data

US 2010/0326908 A1 Dec. 30, 2010

(51) Int. Cl.
*C02F 3/00* (2006.01)
(52) U.S. Cl. .................. 210/748.11; 210/532.2
(58) Field of Classification Search .. 210/748.1–748.15, 210/532.2
See application file for complete search history.

(56) References Cited

U.S. PATENT DOCUMENTS

| | | |
|---|---|---|
| 4,608,157 A | 8/1986 | Graves |
| 5,484,524 A | 1/1996 | MacLaren et al. |
| 6,200,470 B1 * | 3/2001 | Romero et al. .......... 210/170.06 |
| 6,638,420 B2 * | 10/2003 | Tyllila .............................. 210/86 |
| 6,712,970 B1 | 3/2004 | Trivedi |
| 7,018,536 B2 * | 3/2006 | Couch .......................... 210/622 |
| 7,052,607 B1 | 5/2006 | Kulick, III |
| 7,077,959 B2 | 7/2006 | Petrone |
| 7,108,782 B1 | 9/2006 | Higgins et al. |
| 7,294,254 B2 | 11/2007 | White et al. |
| 2008/0185335 A1 | 8/2008 | Holt |

FOREIGN PATENT DOCUMENTS

| | | |
|---|---|---|
| JP | 2006075786 | 3/2006 |
| JP | 2007330883 | 12/2007 |

* cited by examiner

*Primary Examiner* — Chester Barry
(74) *Attorney, Agent, or Firm* — Richard C. Litman

(57) ABSTRACT

The wastewater treatment system includes a tank having first and second partition walls dividing the tank into first, second and third chambers. An inlet port is formed through the first chamber and an outlet port is formed through the third chamber. A first port is formed through the first partition wall for controlling fluid flow from the first chamber to the second chamber, and a second port is formed through the second partition wall for controlling fluid flow from the second chamber to the third chamber. Oils and sludge are removed from the wastewater in the first chamber. Anaerobic bacteria within the second chamber then removes organic material from the water. The water is stored in the third chamber is irradiated by germicidal ultraviolet light before discharge from the third chamber.

14 Claims, 1 Drawing Sheet

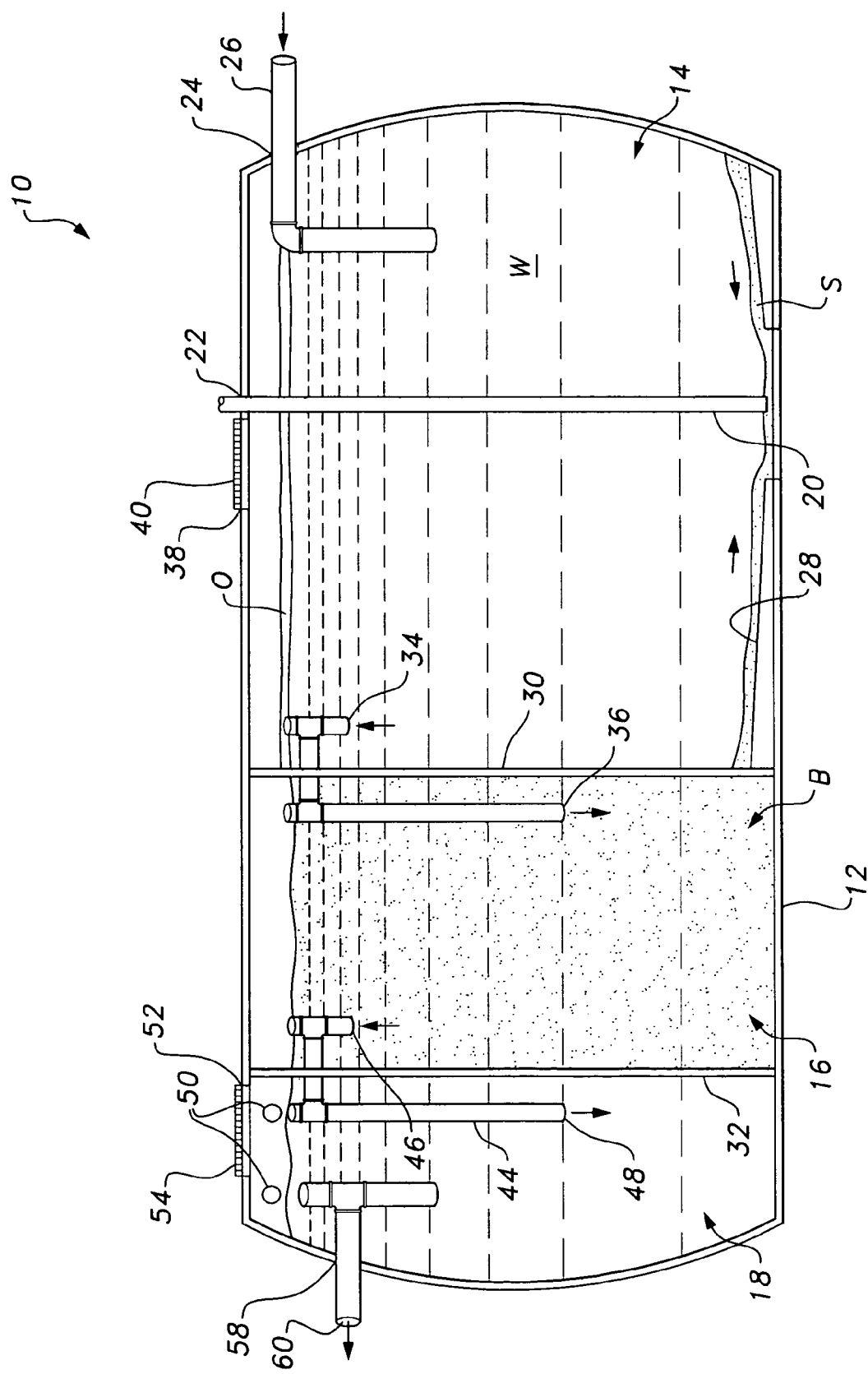

WASTEWATER TREATMENT SYSTEM

BACKGROUND OF THE INVENTION

1. Field of the Invention

The present invention relates to wastewater treatment, and particularly to a system that removes oil, sludge, organic contaminants and bacteria from wastewater generated in homes or buildings that do not have access to a public sewer system so that the treated wastewater can be used for watering lawns or recharging groundwater, or for pretreatment of water discharged into the public sewer system.

2. Description of the Related Art

In order to protect the environment and promote public health, communities typically require wastewater treatment. The discharge of untreated wastewater is not suitable, since it gives rise to numerous environmental concerns. Untreated wastewater contains bacteria that consume high quantities of dissolved oxygen, which is commonly measured as the level of biochemical oxygen demand (BOD) in the water. Thus, when untreated wastewater is released into either aboveground or belowground streams and aquifers, the level of dissolved oxygen in the water of the streams and aquifers begins to deplete, which endangers the water bodies themselves and the resident plant and aquatic life. Over time, the bacteria of the untreated wastewater will deplete the dissolved oxygen in the water to a level that will not support plant and aquatic life. Additionally, in developing nations, where potable water is scarce, it is often desirable to recover as much potable water as possible from wastewater, rather than disposing of both the potable water and the contaminants.

To treat wastewater, communities in highly populated areas commonly collect wastewater and transport it through a series of underground pipes to a centralized wastewater treatment plant. However, there are several problems associated with centralized treatment plants. Centralized wastewater treatment plants are designed and rated for processing a specific flow rate of wastewater per day, typically expressed as the rated capacity of the plant, and all treatment plants have a maximum flow rate capacity. Thus, if a centralized treatment plant receives more wastewater on a particular day than what the plant was designed to handle, problems are encountered. For example, when a treatment plant receives larger-than-normal amounts of untreated raw wastewater, a portion of the untreated wastewater must be diverted into a body of water, such as a river, in order not to exceed the amount of wastewater the plant was designed to handle.

As noted above, discharge of this untreated wastewater into bodies of water will eventually endanger and kill resident plant and aquatic life in the water. Untreated wastewater also contains a number of disease pathogens that are extremely harmful to humans. For example, untreated wastewater is one of the leading causes of dysentery, which can be life threatening if not properly treated. Thus, if a significant amount of untreated wastewater is discharged into a body of water, that body of water will become unavailable for human consumption. On the other hand, if the treatment plant processes the larger-than-normal amounts of untreated wastewater, instead of diverting a portion into a body of water, the influx of untreated wastewater would wash away the bacteria populations used by the plant to treat the untreated wastewater, which would disrupt the entire biological treatment process of the plant. Further, as noted above, wastewater treatment is particularly needed in developing nations, and such large-scale treatment plants may not be available.

In rural areas and in developing nations, construction of centralized wastewater treatment plants may be too expensive to build and maintain. In addition, the cost of connecting residences and businesses in rural areas to a centralized treatment plant via sewage lines may be impracticable due to the greater distance between the those residences and businesses. In such areas, septic systems are usually utilized to treat wastewater. A septic tank is typically a large tank located underground on an owner's property. Septic tanks are categorized as continuous flow systems because wastewater flows into the septic tank at one end, and the same amount of wastewater that entered will exit the tank at the other end. The purpose of a septic tank is to retain any solids in the wastewater and to allow the liquid wastewater to pass through to prevent field lines leading from the septic tank to a drain field from becoming clogged. However, since the wastewater leaving the septic tank has not been treated, the wastewater will be a detriment to the environment, as noted above, and may not be recovered as potable water. Furthermore, as solids build up inside the septic tank, a phenomenon known as periodic upset may occur, causing solids to flow out of the septic tank and into the field lines connected to the tank. Eventually, these field lines will clog due to the buildup and carryover of solids. When this occurs, the field lines have to be excavated and cleaned, which means destruction to a portion of the owner's property as well as increased expense to the owner. Thus, a wastewater treatment system solving the aforementioned problems is desired.

SUMMARY OF THE INVENTION

The wastewater treatment system provides three separate techniques for decontaminating wastewater contained within a single system, thus optimizing the decontamination of the wastewater. The wastewater treatment system includes a tank having first and second partition walls dividing the tank three chambers. An inlet port is formed to admit wastewater to the first chamber and an outlet port is formed to discharge treated wastewater from the third chamber.

A first port is formed through the first partition for selectively controlling fluid flow from the first chamber to the second chamber, e.g., by siphoning, and a second port is similarly formed through the second partition for selectively controlling fluid flow from the second chamber to the third chamber, e.g., by siphoning. The first chamber is adapted for separating oils and solid particulate matter from wastewater injected therein through the inlet port. Further, the oils and organic matter begin to decompose at this stage by an anaerobic process.

The second chamber contains anaerobic bacteria so that the oil-free and particulate-free water transferred from the first chamber to the second chamber is treated by the anaerobic bacteria for removal of organic waste material from the water.

Treated water is stored in the third chamber. Before being discharged from the third chamber, the treated water is exposed to germicidal ultraviolet (UV) radiation for removal of harmful microorganisms. The UV apparatus may be disposed within the third chamber, adjacent the third chamber and connected thereto by piping, or in the outlet port.

The stored water may then be selectively dispensed from the third chamber through the outlet port. These and other features of the present invention will become readily apparent upon further review of the following specification and drawings.

BRIEF DESCRIPTION OF THE DRAWINGS

The sole FIGURE is a diagrammatic side view of a wastewater treatment system according to the present invention.

DETAILED DESCRIPTION OF THE PREFERRED EMBODIMENTS

Referring to the sole FIGURE, the wastewater treatment system 10 includes a tank 12 having first and second internal partition walls 30, 32 dividing the tank 12 into first, second and third chambers 14, 16, 18. The tank 12 may be formed from or lined with any suitable non-corrosive material, such as glass reinforced plastic (GRP) or fiberglass. The tank 12 may have any desired dimensions and configuration, a cylindrical tank 12 being shown in the drawing for exemplary purposes. Representative exemplary dimensions include a height of approximately 3½ meters, and a length of approximately seven meters, with first chamber 14 having a length of approximately four meters, second chamber 16 having a length of approximately two meters, and third chamber 18 having a length of approximately one meter.

An inlet port 24 is formed in the tank 12 for the flow of wastewater into the first chamber 14. An outlet port 58 is formed through the tank 12 for discharge of treated wastewater from the third chamber 18. Preferably, an input pipe 26 extends through inlet port 24, allowing wastewater W to be input into the first chamber 14. Similarly, an output pipe 60, which preferably includes a valve, spigot or the like, extends through outlet port 58 for selectively dispensing the treated wastewater stored within third chamber 18, as will be described in greater detail below. Using the exemplary dimensions given above, input pipe 26 and output pipe 60 may have diameters of approximately six inches each, and may be formed from any suitable non-corrosive material.

A first port is formed through the first partition wall 30 for selectively controlling fluid flow from the first chamber 14 to the second chamber 16, and a second port is similarly formed through the second partition wall 32 for selectively controlling fluid flow from the second chamber 16 to the third chamber 18. Preferably, the first and second ports include, respectively, first and second siphon tubes, with the first siphon tube including an input tube 34, positioned within first chamber 14, and an output tube 36 positioned within second chamber 16. Similarly, the second siphon tube preferably includes input tube 46, positioned within second chamber 16, and output tube 48, positioned within third chamber 18. The first siphon tube draws fluid from the first chamber 14 to the second chamber 16. Similarly, the second siphon tube draws fluid from the second chamber 16 to the third chamber 18.

The first chamber 14 is configured for separating oils O and solid particulate matter from wastewater W as sediment or sludge S. Once wastewater W is injected through port 24, via pipe 26, under any suitable pressure or by gravity, the wastewater W remains within first chamber 14 for a suitable length of time to allow oil O to separate therefrom, and rise to the surface of the wastewater W, and to allow sludge S to precipitate out of the wastewater W and collect at the bottom of first chamber 14 as sediment.

An opening 38 is formed through the upper wall of first chamber 14, and is removably covered by a cover 40, which may be a conventional manhole-type cover for maintenance. This allows oil O to be easily skimmed from the surface of the wastewater W. The floor of first chamber 14 preferably has a sloped surface 28, as shown, causing sludge S to fall to the lower central region under the force of gravity. A removal pipe 20 is preferably provided, with the removal pipe 20 having a lower end positioned above the floor for the removal of the sludge S, and an upper end thereof projecting through an opening 22 formed through the upper wall of the first chamber, allowing the sludge S to be removed via suction. Once the wastewater W has had oil O and sludge S separated therefrom, it is drawn into second chamber 16, through the first siphon tube, through input tube 34 and out through output tube 36.

The second chamber 16 contains anaerobic bacteria so that the oil-free and particulate-free water W transferred from the first chamber 14 into the second chamber 16 is treated by the anaerobic bacteria B for removal of organic waste material from the water W. Wastewater typically contains relatively large amounts of readily available organic material that would produce a rapid growth of microorganisms if treated aerobically. Anaerobic decomposition is able to degrade this organic material while producing much less (approximately one-tenth) biomass than an aerobic treatment process. The principal function of anaerobic digestion is to stabilize insoluble organic matter and to convert as much of these solids as possible to end products, such as liquids and gases (including methane) while producing as little residual biomass as possible. Anaerobic treatment of organic materials in wastewater is well known, and any suitable type of bacteria B may be used.

Following the anaerobic treatment of wastewater W to remove the organic material therefrom, the water W is transferred by siphoning through input tube 46 and out through output tube 48 into the third chamber 18. The treated water may be stored in the third chamber 18. Before being discharged from the third chamber, the water is exposed to germicidal ultraviolet radiation. It is well known in the art that at certain frequencies, ultraviolet light exhibits germicidal activity against microorganisms that might otherwise cause or spread disease or infection, and ultraviolet light assemblies for use in water supply systems are commercially available. The ultraviolet light apparatus 50 may be disposed within the third chamber 18, adjacent the third chamber 18 and connected thereto by piping, or disposed in the outlet port. An opening 52 covered by cover 54 (similar to opening 38 and cover 40 in first chamber 14) may be provided in the third chamber 18 for maintenance and access purposes.

The third chamber 18 is adapted for storage of the decontaminated, sterilized potable water. When it is needed, the water is dispensed through output pipe 60, which preferably includes a valve, spigot or any other suitable dispenser.

It is to be understood that the present invention is not limited to the embodiment described above, but encompasses any and all embodiments within the scope of the following claims.

We claim:

1. A wastewater treatment system, comprising:
a tank having first and second partition walls dividing the tank into first, second and third chambers, the first chamber being configured for removal of oil and particulate matter from the wastewater;
an inlet port forming a conduit for inlet of wastewater into the first chamber;
an outlet port forming a conduit for discharge of treated wastewater from the third chamber;
a first port formed through the first partition wall for selective transfer of wastewater from the first chamber to the second chamber, wherein said first and second chambers are fluidly separated and sealed from one another except through the selective transfer of the wastewater through said first port;

a second port formed through the second partition wall for selective transfer of wastewater from the second chamber to the third chamber, wherein said second and third chambers are fluidly separated and sealed from one another except through the selective transfer of the wastewater through said second port;

anaerobic bacteria disposed in the second chamber for removal of organic waste material from the wastewater transferred from the first chamber after removal of oil and particulate matter; and an apparatus disposed to expose the wastewater to germicidal ultraviolet radiation after removal of organic waste in the second chamber and before discharge from the outlet port.

2. The wastewater treatment system as recited in claim 1, further comprising an inlet pipe extending through said inlet port.

3. The wastewater treatment system as recited in claim 2, further comprising:

an outlet pipe extending through said outlet port; and
means for selectively and controllably sealing the outlet pipe.

4. The wastewater treatment system as recited in claim 3, wherein the first chamber includes a removal pipe for removal of the particulate matter settling on the floor as sediment and sludge.

5. The wastewater treatment system as recited in claim 4, wherein the floor of the first chamber is angled and slopes toward the removal pipe to facilitate removal of the sediment and sludge settling out of the wastewater and onto the floor.

6. The wastewater treatment system as recited in claim 5, wherein an upper opening is formed in the first chamber for permitting removal of the oils separating from the wastewater.

7. The wastewater treatment system as recited in claim 6, further comprising a first manhole cover for removably covering and sealing the upper opening formed through the upper wall of the first chamber.

8. The wastewater treatment system as recited in claim 1, further comprising a first siphon tube extending through the first port.

9. A wastewater treatment system as recited in claim 8, further comprising a second siphon tube extending through the second port.

10. The wastewater treatment system as recited in claim 9, wherein an upper opening is formed in the third chamber.

11. The wastewater treatment system as recited in claim 10, further comprising a second manhole cover for removably covering and sealing the upper opening formed through the upper wall of the third chamber.

12. The wastewater treatment system as recited in claim 1, wherein the UV apparatus is disposed within the third chamber.

13. The wastewater treatment system as recited in claim 1, wherein the UV apparatus is disposed adjacent the third chamber and connected thereto by piping.

14. The wastewater treatment system as recited in claim 1, wherein the UV apparatus is disposed within the outlet port.

\* \* \* \* \*